United States Patent
Lemasson

(10) Patent No.: US 7,852,225 B2
(45) Date of Patent: Dec. 14, 2010

(54) DRIVER ALERT SYSTEM FOR THE STEERING WHEEL OF A MOTOR VEHICLE

(75) Inventor: Pascal Lemasson, St. Georges les Baillargeaux (FR)

(73) Assignee: Autoliv Development AB, Vargarda (SE)

( * ) Notice: Subject to any disclaimer, the term of this patent is extended or adjusted under 35 U.S.C. 154(b) by 306 days.

(21) Appl. No.: 12/039,055

(22) Filed: Feb. 28, 2008

(65) Prior Publication Data

US 2009/0079551 A1 Mar. 26, 2009

(30) Foreign Application Priority Data

Sep. 25, 2007 (DE) .................. 20 2007 013 477

(51) Int. Cl.
*G08B 23/00* (2006.01)
(52) U.S. Cl. ................. 340/576; 340/407.1; 340/425.5; 340/438
(58) Field of Classification Search ............ 340/576, 340/384.6, 407.1, 425.5, 582, 679, 683, 965; 343/112, 113; 280/271; 701/41, 42
See application file for complete search history.

(56) References Cited

U.S. PATENT DOCUMENTS 3,814,532 A * 6/1974 Barrett et al. ............... 404/117
6,236,306 B1 * 5/2001 Liebelt .................... 340/407.1

FOREIGN PATENT DOCUMENTS

EP 0 856 432 A2 8/1998

* cited by examiner

*Primary Examiner*—Hung T. Nguyen
(74) *Attorney, Agent, or Firm*—Harness, Dickey & Pierce, P.L.C.

(57) ABSTRACT

A driver alert system for the steering wheel of a motor vehicle includes a vibration module with an eccentric mass and a driving device for rotating said eccentric mass about a rotational axis. The vibration module is arranged such that the rotational axis of the eccentric mass is essentially parallel to the steering column axis.

17 Claims, 5 Drawing Sheets

DRIVER ALERT SYSTEM FOR THE STEERING WHEEL OF A MOTOR VEHICLE

CROSS REFERENCE TO RELATED APPLICATION

This application claims the benefit of German Utility Model Application No. 202007013477.0 filed 25 Sep. 2007. The disclosure of the above application is incorporated herein by reference.

FIELD

The present disclosure relates to a driver alert system for the steering wheel of a motor vehicle.

BACKGROUND

The statements in this section merely provide background information related to the present disclosure and may not constitute prior art.

A vibration module comprising a pair of piezoelectric actuating elements located on the steering wheel is known from EP 0 856 432 A2. However, practically suitable piezoelectric actuating elements require very high operating currents. Furthermore, because the forces used to rotate the steering wheel usually act on the piezoelectric elements these have to be largely dimensioned.

From another embodiment of EP 0 856 432 A2 a vibration module comprising an electric motor with an eccentric mass connected to the motor axis is known. A significant portion of the vibrations exerted by the rotating eccentric mass have components perpendicular to the steering rim plane. These vibrations effectively generate unwanted noise in the steering wheel column and adjacent components such as the instrument panel and/or a central arm rest. Furthermore, since a significant portion of the vibration energy is transmitted away through the steering wheel column, the strength of the vibrations in the steering rim and therefore the effectiveness of the alert function is reduced.

It remains desirable to provide a driver alert system with a compact and effective vibration module and with reduced noise in the steering wheel column and adjacent components.

SUMMARY

The present teachings provide a driver alert system for a steering wheel having an eccentric mass with a rotational axis that is essentially parallel to the steering column axis. As a result, the eccentric mass essentially rotates parallel to the plane of the steering wheel rim. In certain applications, the eccentric mass rotates in the plane of the steering wheel rim. This significantly reduces the vibrations transported through the steering column causing unwanted noise. Furthermore, the amplitude of the vibrations in the steering rim, and therefore the effectiveness of the alert system, is not affected by vibration losses through the steering column.

Essentially parallel or substantially parallel to the steering column axis means that the component of the rotational axis parallel to the steering column axis is larger than the component of the rotational axis perpendicular to the steering column axis. In other words, the angle between the rotational axis of the eccentric mass and the steering column axis is smaller than 45°. Preferably this angle is smaller than 30°, more preferably smaller than 15°, in particular 0° within practical tolerances, which further increases the advantageous effect of the present teachings.

The vibration module may be arranged as close as practically possible to the rim of the steering wheel which increases the vibration amplitude in the steering wheel rim and reduces the vibration amplitude in the steering column. At least, the vibration module may be arranged closer to the steering wheel rim than to the steering column.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DESCRIPTION OF VARIOUS ASPECTS

Figure 1:
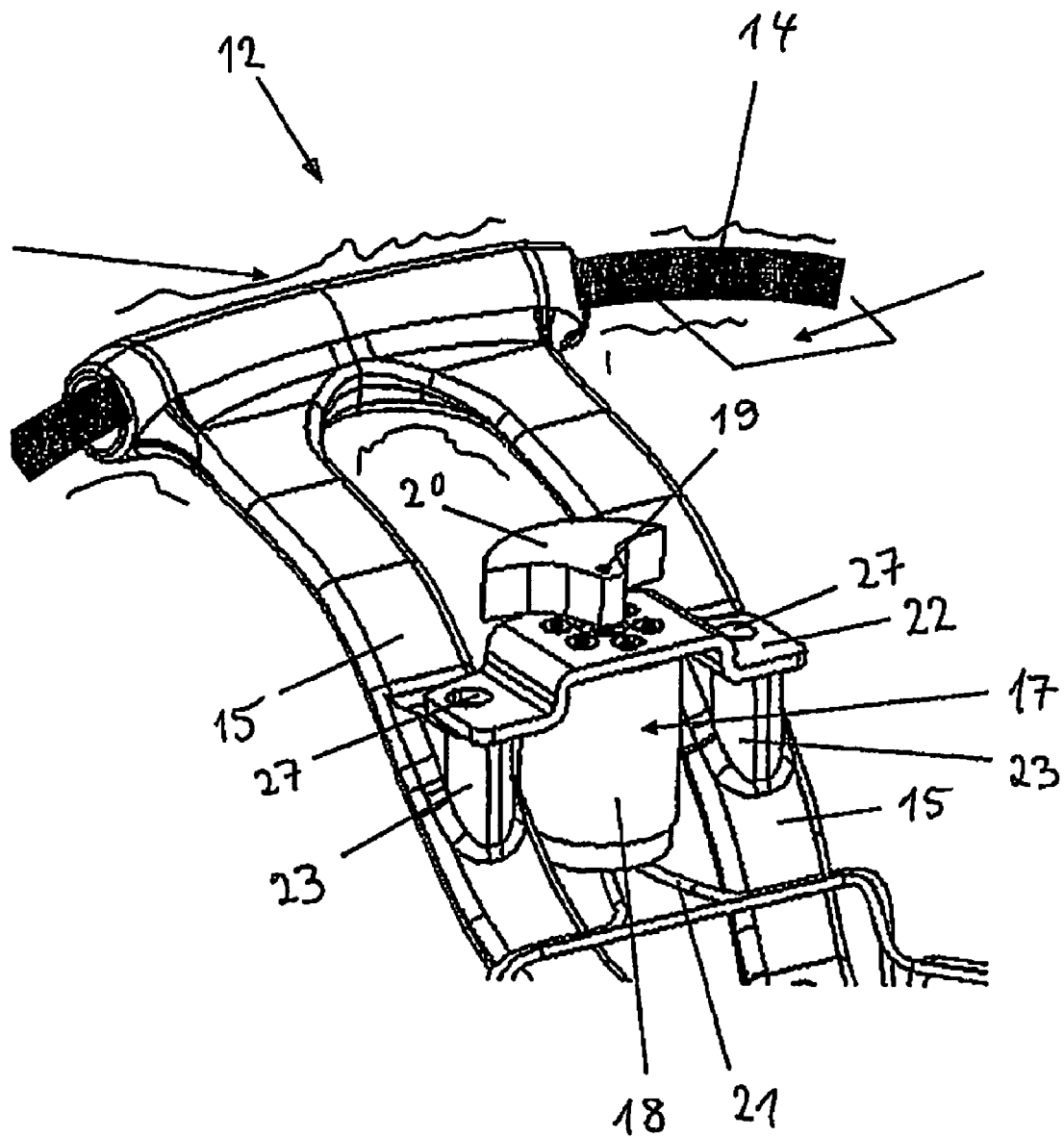
FIG. 1 is a perspective view of part of a steering wheel.

The following description is merely exemplary in nature and is not intended to limit the present disclosure, application, or uses. It should be understood that throughout the drawings, corresponding reference numerals indicate like or corresponding parts and features. The description and any specific examples, while indicating embodiments of the present disclosure, are intended for purposes of illustration only and are not intended to limit the scope of the present disclosure. Moreover, recitation of multiple embodiments having stated features is not intended to exclude other embodiments having additional features, or other embodiments incorporating different combinations of the stated features.

A steering wheel arrangement 10 of the present teachings is arranged in a combustion motor vehicle and comprises a steering column 11 and a steering wheel 12 which is mounted to the steering column 11 at steering wheel hub 13. The steering wheel 12 comprises a peripheral rim 14 and a frame part 16 comprising spokes 15 for connecting the rim 14 to the hub 13. The frame part 16 and the rim 14 are covered with a suitable outer covering, for example a foam material.

A vibration module 17 is connected to the frame part 16, more particularly to a spoke 15, of the steering wheel 12. The vibration module 17 comprises an electric motor 18 with a rotational axis 19, a mass 20 eccentrically connected to the rotational axis 19 of the electric motor 18, a cable assembly 21 for supplying and controlling the electric motor 18 and a fixing element 22 for connecting the vibration unit 17 to the steering wheel 12.

The cable assembly 21 connects the electric motor 18 to a power unit and/or an electronic control unit, which are not shown in the Figures. The vibration unit 17 is activated upon a signal from the control unit, which receives and processes signals from crash sensors, for instance for detecting an emergency situation where sensors detect that another vehicle or an obstacle is approaching, and/or one or more sensors for detecting drowsiness of the driver, for example an in-car camera. Upon activation of the vibration unit 17 a voltage is supplied to the electric motor 18 causing to rotate the eccentric mass 20 and thus to alert the driver by vibrations transmitted to the rim 14. The intensity of the vibration may be tuned for different alert situations.

Figure 3:
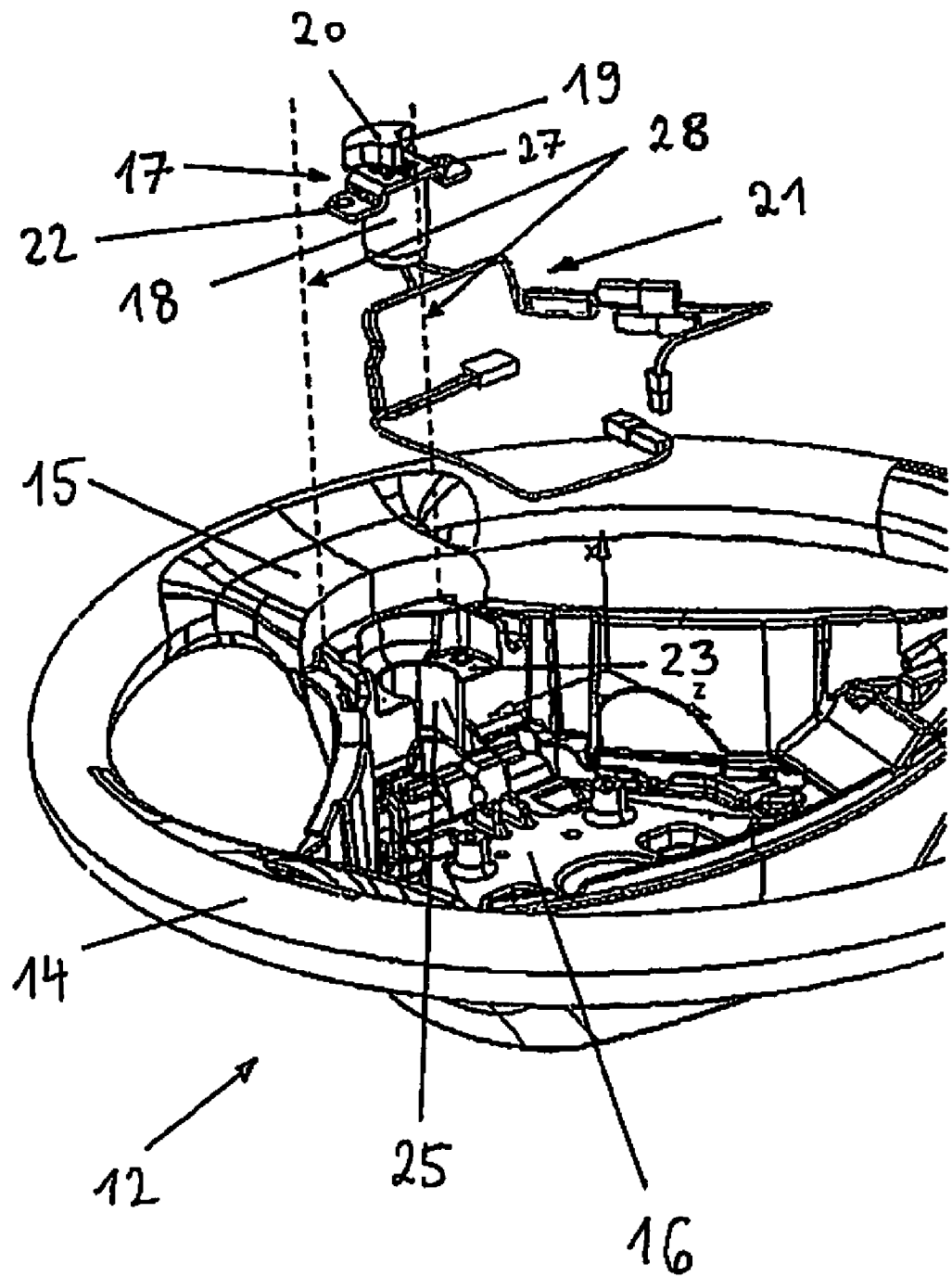
FIG. 3 is a perspective view of a steering wheel with vibration module extracted.
Figure 4:
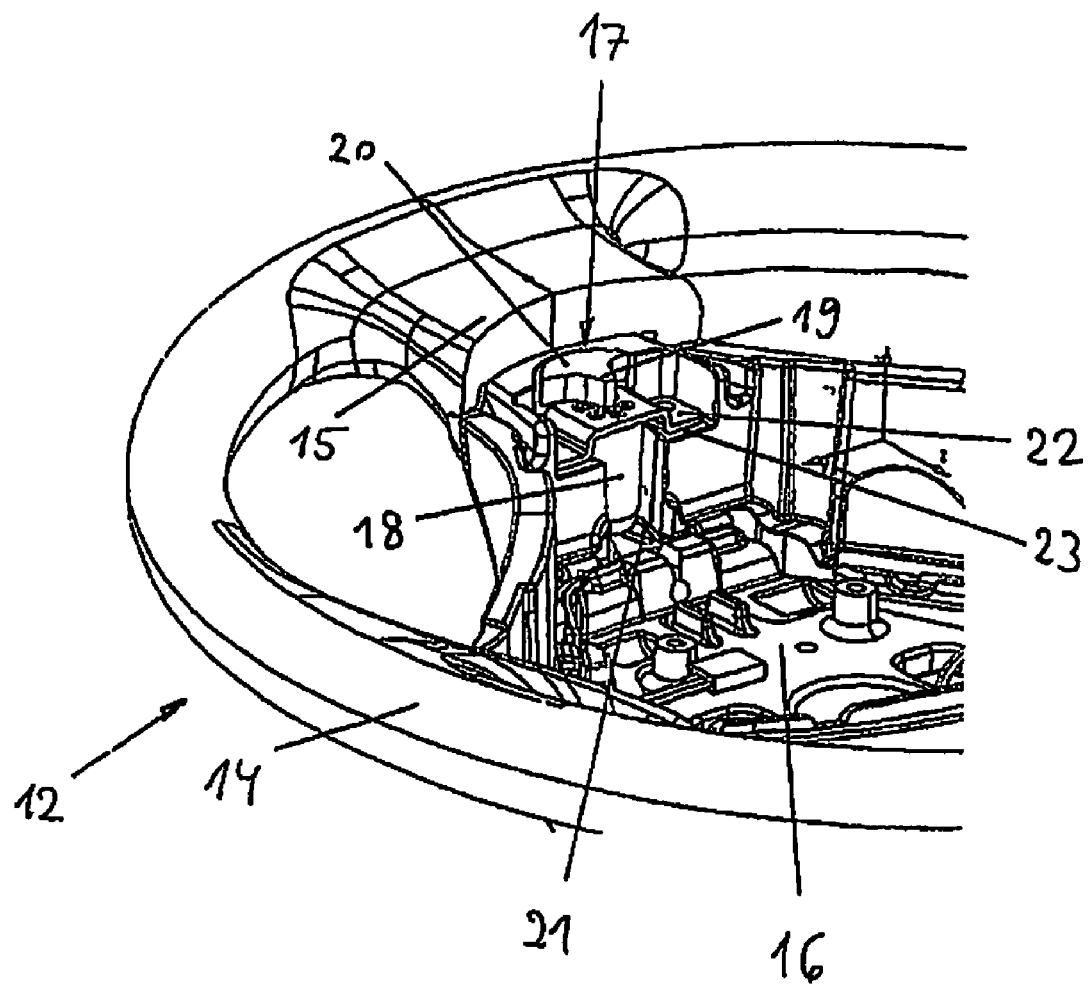
FIG. 4 is a perspective view of a steering wheel with vibration module mounted.
Figure 5:
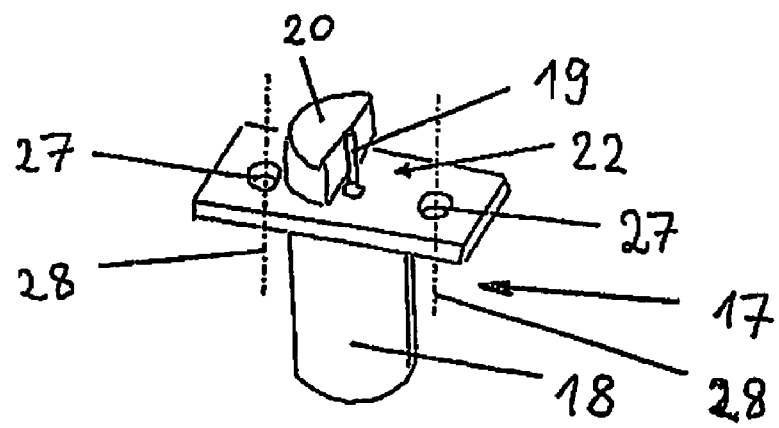
FIG. 5 is a schematic perspective view of an electric drive with fixing element.
Figure 6:
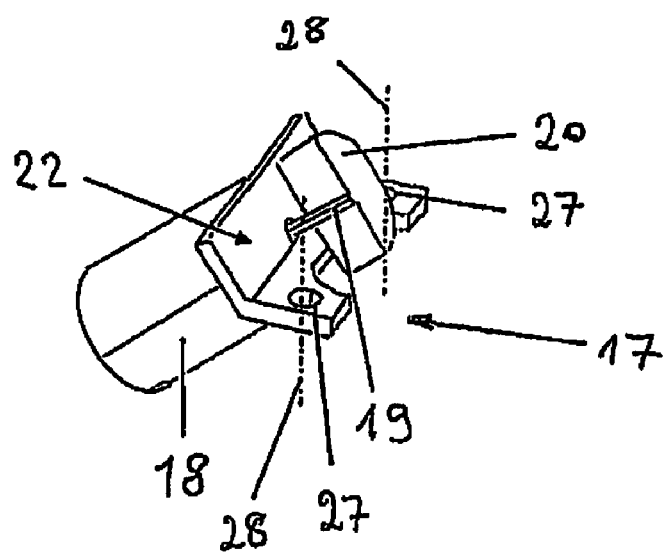
FIG. 6 is a schematic perspective view of an electric drive with fixing element in a different embodiment.

The frame part 16 of the steering wheel 12 comprises support means 23 to which the fixing element 22 may be mounted by suitable connecting elements, for example screws. The orientation 28 of the connecting elements, see FIG. 3, is preferably perpendicular to the rim plane 24 in order to simplify the mounting of the vibration module 17. In the preferred embodiment shown in FIG. 5, the fixing element 22 is a plate, with screw holes 27 with screwing direction 28 parallel to the motor axis 19. In another embodiment shown in FIG. 6, where the fixing element 22 is an angled plate, support means 23 may be unnecessary. The fixing element is made of a suitable material, in particular metal or plastic.

The frame part 16 may comprise a compartment 25 for the motor 18, as can be seen in FIG. 3.

Figure 2:
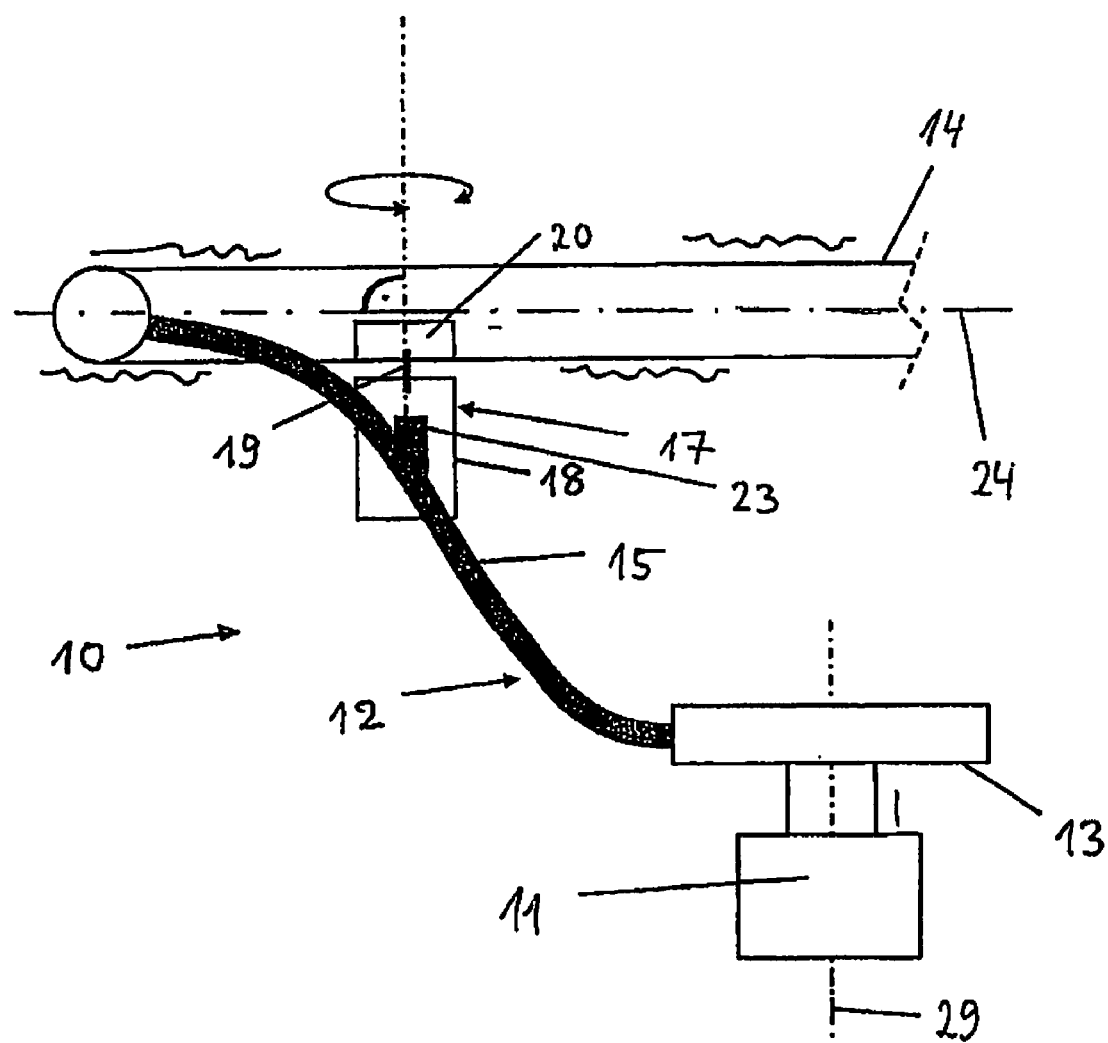
FIG. 2 is a schematic cross-sectional view of a steering wheel arrangement.

The fixing element 22 connected to the support means 23 holds the motor 18 in an oriented state where the rotational axis 19 of the motor 18 is essentially parallel to the axis 29 of the steering column 11 or, in other words, essentially perpendicular to the symmetry plane 24 of the steering wheel rim 14, as shown in FIG. 2. Therefore, the eccentric mass 20, and with it the centrifugal force vector, rotates in a plane essentially parallel to the rim plane 24. This leads to a very effective excitation of vibrations along the circumference of the steering wheel rim 14, whereas vibrations transmitted to the steering column 11 are suppressed.

As can be seen in FIG. 2, the eccentric mass 20 must not be arranged exactly within the symmetry plane 24 of the rim 14, but preferably the mass 20 is arranged as close to the rim 14 as practically possible in order to increase the effectiveness of vibrations in the rim 14 and reduce vibrations in the steering column 11. Preferably there is at least an overlap between the eccentric mass 20 and the steering wheel rim 14 in a cross-sectional view as in FIG. 2.

For similar reasons, the vibration unit 17 is preferably arranged closer to the rim 14 than to the hub 13. Generally speaking, the vibration unit 17 is preferably arranged as close to the rim 14 as possible.

Although only one vibration unit 17 is shown in the Figures, the steering wheel 12 may comprise a plurality of vibration units 17, for example one vibration unit 17 for each spoke 15 of the steering wheel 12.

While specific examples have been described in the specification and illustrated in the drawings, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and any appended claims.

What is claimed is:

1. A driver alert system for a steering wheel of a motor vehicle in combination with the steering wheel, the driver alert system comprising:
   a vibration module with an eccentric mass supported by a spoke of the steering wheel, the spoke having a first portion and a second portion defining an opening therebetween receiving a portion of the vibration module therein; and
   a driving device for rotating the eccentric mass about a rotational axis.

2. The driver alert system of claim 1, wherein the eccentric mass is arranged to rotate generally within a plane extending through a rim of the steering wheel and substantially perpendicular to a steering column axis.

3. The driver alert system of claim 1, further comprising a fixing element adapted to hold the vibration module oriented relative to the spoke, the fixing element having a first attachment location attached to the first portion of the spoke and a second attachment location attached to the second portion of the spoke.

4. The driver alert system of claim 3, further comprising a first support extending from the first portion of the spoke and a second support extending from the second portion of the spoke, the first support and the second support each including a mounting surface disposed substantially parallel to a plane extending through a rim of the steering wheel and substantially perpendicular to a steering column axis and respectively supporting the fixing element at the first attachment location and the second attachment location.

5. The driver alert system of claim 4, further comprising a first fastener operable to attach the fixing element to the first support and a second fastener operable to attach the fixing element to the second support, the first fastener and the second fastener extending in a direction substantially perpendicular to the plane.

6. The driver alert system of claim 1, wherein the driving device comprises an electric motor.

7. The driver alert system of claim 1, wherein the vibration module is arranged such that a rotational axis of the eccentric mass is substantially parallel to a steering column axis.

8. The driver alert system of claim 1, wherein the opening extends through the spoke.

9. The driver alert system of claim 1, in combination with the steering wheel.

10. The driver alert system of claim 1, wherein at least a portion of the vibration module extends through the spoke at the opening.

11. The driver alert system of claim 10, further comprising a frame having a compartment receiving a portion of the vibration module extending through the spoke.

12. The driver alert system of claim 1, wherein the vibration module is arranged such that an angle between a rotational axis of the eccentric mass and a steering column axis is smaller than approximately forty-five (45) degrees.

13. A driver alert system for a steering wheel of a motor vehicle in combination with the steering wheel, the driver alert system comprising:
   a vibration module with an eccentric mass, the vibration module supported by a spoke of the steering wheel and extending at least partially through the spoke; and
   a driving device for rotating the eccentric mass about a rotational axis.

14. The driver alert system of claim 13, wherein the vibration module is arranged such that a rotational axis of the eccentric mass is substantially parallel to a steering column axis.

15. The driver alert system of claim 13, wherein the eccentric mass is arranged to rotate generally within a plane extending through a rim of the steering wheel and substantially perpendicular to a steering column axis.

16. The driver alert system of claim 13, further comprising a fixing element adapted to hold the vibration module oriented relative to the spoke, the fixing element having a first attachment location attached to a first portion of the spoke and a second attachment location attached to a second portion of the spoke.

17. The driver alert system of claim 13, wherein the vibration module is arranged such that an angle between a rotational axis of the eccentric mass and a steering column axis is smaller than approximately forty-five (45) degrees.

* * * * *